United States Patent [19]

Carrier

[11] 4,256,722

[45] Mar. 17, 1981

[54] PROCESS FOR PRODUCING POROUS SPINEL MATERIALS

[75] Inventor: Gerald B. Carrier, Corning, N.Y.

[73] Assignee: Corning Glass Works, Corning, N.Y.

[21] Appl. No.: 94,487

[22] Filed: Nov. 15, 1979

[51] Int. Cl.$^3$ .................. C01G 49/00; C01G 37/14; C01F 7/04

[52] U.S. Cl. ................................ 423/594; 423/595; 423/596; 423/600; 423/593; 423/599

[58] Field of Search .............. 423/593, 594, 600, 595, 423/596

[56] References Cited

U.S. PATENT DOCUMENTS

| | | | |
|---|---|---|---|
| 2,703,789 | 3/1955 | McKinley et al. | 423/594 |
| 3,423,194 | 1/1969 | Kearby | 423/594 |
| 3,909,455 | 9/1975 | Rainer et al. | 423/600 |
| 3,948,808 | 4/1976 | Box et al. | 423/600 |
| 3,998,939 | 12/1976 | Mason et al. | 423/600 |
| 4,097,300 | 6/1978 | Balducci et al. | 423/600 |

*Primary Examiner*—Herbert T. Carter
*Attorney, Agent, or Firm*—Clinton S. Janes, Jr.

[57] ABSTRACT

The instant invention is related to the production of porous spinel materials which exhibit exceptional durability in both acid and basic solutions, and possess high porosity with high surface area and narrow range of pore size. More specifically, the present invention is directed to the production of porous spinel materials involving the impregnation of finely-divided trivalent metal oxides, usually $Al_2O_3$, $Fe_2O_3$, or $Cr_2O_3$, with a solution of a divalent metal ion-containing compound, commonly selected from the group of $Mg^{+2}$, $Fe^{+2}$, $Mn^{+2}$, and $Zn^{+2}$, and thereafter firing the mixture to effect reaction, resulting in the conversion of the trivalent metal oxide to a spinel.

6 Claims, 5 Drawing Figures

PROCESS FOR PRODUCING POROUS SPINEL MATERIALS

BACKGROUND OF THE INVENTION

The use of porous particles having high surface areas, principally because of inherent high porosity, has increased markedly over the past several years. Such applications have included catalyst supports, filter media, carriers in chromatographic columns, and in immobilized enzyme composites. Considerable research has been conducted to develop porous bodies particularly useful in each specific application and wherein the range of pore diameters present therein is strictly circumscribed. Thus, porous glass has been used for such applications and U.S. Pat. No. 3,892,580 describes the manufacture of porous bodies of $Al_2O_3$, $TiO_2$, $ZrO_2$, and $SiO_2$ wherein the size of the pores is carefully controlled. The latter bodies generally demonstrated better resistance to acids and bases than did glass.

Nevertheless, the chemical durability of porous material in a hostile environment remains a problem. The high surface area of the material offers extreme exposure opportunity for attack. This concern regarding chemical durability is especially critical in the alkaline solutions encountered where the porous material is utilized as a support for immobilized enzymes.

PRIOR ART

U.S. Pat. No. 3,892,580 discloses the production of porous bodies of $Al_2O_3$, $TiO_2$, $ZrO_2$, and $SiO_2$ having very high porosities and wherein the size of the pore diameters is maintained within a tighyly controlled range. Basically, the method involved combining a liquid binder with the metal oxide is finely-divided form to yield a slurry having a uniform consistency, drying the mixture, and then firing at a temperature below the sintering temperature of the metal oxide. As a binder to join the metal oxide particles together, the patent cites the utility of acetic acid, propionic acid, sodium acetate, magnesium acetate, and zinc acetate.

SUMMARY OF THE INVENTION

The instant invention contemplates the manufacture of porous materials consisting essentially of spinel and/or crystals isostructural with spinel which evidence very high porosity and wherein the size of the pore diameters can be delimited within a very narrow range. Classic spinel has the composition $MgO.Al_2O_3$. However, mineralogists have classified a group of minerals as "spinels" which have the general formula $AB_2O_4$ and are isostructural with the classic spinel. Some solid solution has been observed such that the molar ratio A:B is not required to be exactly 1:2. For this reason, the more general formula $AO.B_2O_3$ has been postulated to encompass a spinel structure. Nevertheless, in either case, A customarily represents a divalent metal ion commonly selected from the group of $Mg^{+2}$, $Fe^{+2}$, $Zn^{+2}$, and $Mn^{+2}$ and, less frequently, $Co^{+2}$ and $Ni^{+2}$. B conventionally represents a trivalent metal ion normally selected from the group of $Al^{+3}$, $Fe^{+3}$, and $Cr^{+3}$ and, less frequently, $Co^{+3}$, $Mn^{+3}$, and $Ga^{+3}$. Examples of such "spinels" include gahnite [$ZnO.Al_2O_3$], pleonaste [$(Mg,Fe)O.Al_2O_3$], picotite [$(Mg,Fe)O.(Al,Cr)_2O_3$], chromite [$FeO.Cr_2O_3$], hercynite [$FeO.Al_2O_3$], and magnetite [$FeO.Fe_2O_3$].

The inventive method contemplates three general steps:

First, porous, very finely-divided trivalent metal oxide is impregnated with a solution of a divalent metal ion-containing compound which, upon pyrolysis, will be converted to the respective oxide or other compound which, in turn, will react with said trivalent metal oxide to form a spinel.

Second, the impregnated material is dried.

Third, the dried material is fired at a temperature of at least 800° C., but no higher than about 1250° C.

The firing step causes two phenomena to occur. First, the divalent metal ion-containing compound is pyrolyzed to the oxide or other compound which then reacts with the trivalent metal oxide to produce a crystal having a spinel-type structure. Second, the very finely-divided powder is sintered into a porous solid.

For such applications as support materials for immobilized enzymes, this porous solid will be pulverized to the desired particle size.

DESCRIPTION OF PREFERRED EMBODIMENTS

Figure 1:

Inasmuch as the final product of the invention contemplates the essential total conversion of the trivalent metal oxide starting material to spinel, several composition and process parameters must be observed.

First, the trivalent metal oxide starting material will be of high purity.

Second, the trivalent metal oxide starting material will be of very fine particle size with a surface area preferably between about 50–500 meters$^2$/gram. This very fine particle size is to assure complete reaction with the divalent metal ion-containing material and a fine pore structure.

Third, the divalent metal ion-containing compound will be one which, upon pyrolysis, will be converted essentially solely to the corresponding divalent metal oxide or other compound such that the spinel phase formed upon reaction with trivalent metal oxide will be of very high purity.

Fourth, aqueous solutions of the divalent metal ion-containing compounds will be employed as a matter of convenience and economics. Nevertheless, non-aqueous solvents for the compounds can be used with equal utility. Such solvents may include such organic liquids as ethyl alcohol and methyl ethyl ketone.

Fifth, liquid suspensions of the divalent metal ion-containing compounds will normally be avoided since such hazard incomplete reaction with the trivalent metal oxide starting material.

Sixth, to effect the complete reaction with the trivalent metal oxide to form spinel, the amount of divalent metal ion-containing compound utilized will be designed such that, upon pyrolysis, an amount of divalent metal oxide or other compound will be produced which is at least sufficient to react stoichiometrically with the trivalent metal oxide. In general, a slight excess is preferred to insure complete conversion of the trivalent metal oxide to spinel. Excess trivalent metal oxide or divalent metal oxide can be leached out of the spinel through contact with a mineral acid since the spinel is much more resistant to acids than are the oxides. Customarily, the quantity of divalent metal ion-containing compound employed will be that sufficient to produce an amount of the corresponding divalent metal oxide ranging from about 5%, by weight, less than that required to stoichiometrically react with the trivalent metal oxide, to about 10%, by weight, above that required to stoichiometrically react with the trivalent metal oxide.

Seventh, the mixing of the trivalent metal oxide particles with the solution of divalent metal ion-containing compound will, as a matter of convenience, be undertaken at room temperature. However, it will be appreciated that any temperature between the freezing point and the boiling point of the solution will be operable.

Eighth, the divalent metal ion-containing compound ought to be reasonably soluble in water or other solvents. Useful compounds include, but are not limited to, include: magnesium acetate, magnesium salicylate, magnesium iodide, magnesium nitrate, magnesium thiosulfate, zinc acetate, zinc chlorate, zinc perchlorate, zinc iodide, zinc nitrate, zinc sulfate, ferrous acetate, ferrous chloride, ferrous nitrate, manganese acetate, manganese chloride, and manganese nitrate.

Ninth, the drying of the impregnated trivalent metal oxide can be undertaken at room temperature, but, to expedite this step, elevated temperatures below the boiling point of the solution are preferred. Drying below the boiling point eliminates the hazard of the particles being violently agitated as the water or other solvent is vigorously expelled. Simply drying the material in air is quite practical although, where desired, more rapid and sophisticated methods as spray drying, drum drying, or the use of vacuum are equally feasible.

Tenth, a firing temperature of at least 800° C. is required to cause the reaction of the divalent metal oxide or other compound with the trivalent metal oxide to form spinel. Somewhat higher temperatures are generally preferred since such expedite the reaction and concomitant sintering. However, temperatures much in excess of about 1250° C. are commonly to be avoided since the rate of sintering becomes so great that pore size control becomes extremely difficult. Spinel and gahnite are the most desirable crystalline products. The preferred firing temperatures range between about 900°–1100° C. for spinel and about 850°–1000° C. for gahnite.

The following working examples must be considered as illustrative only and not inclusive or limitative of the inventive method or the materials useful in carrying out the inventive method.

Formation of Spinel Product

Fumed alumina, marketed by Cabot Corporation, Boston, Massachusetts under the trademark ALON ®, formed the source of $Al_2O_3$. This material is of high purity and is exceedingly fine-grained, having a surface area of about 50 meters$^2$/gram and a typical particle size under 500 Å.

The selected magnesium-containing compound which can be pyrolyzed to MgO was reagent grade magnesium nitrate, hexahydrate $[Mg(NO_3)_2.6H_2O]$.

A stock solution of the magnesium nitrate was made by dissolving 68.77 grams of the $Mg(NO_3)_2.6H_2O$ in sufficient distilled water to make 100 ml. of solution. Thereafter, six test samples were prepared by thoroughly mixing 12 ml. of that solution with three grams of the $Al_2O_3$. The mixtures were placed in platinum crucibles and dried in air at a temperature just below the boiling point. The crucibles were then transferred to an electrically-heated tube furnace and fired for 16 hours at 700° C., 800° C., 900° C., 1000° C., 1100° C., and 1200° C., respectively. For comparison purposes, a sample of the ALON ® alumina was fired for 16 hours at 800° C. Examination of the fired samples showed that sintering has occurred in each such that a porous mass remained in the crucible. A 16-hour firing time was chosen simply out of convenience since the samples could be left in the furnace overnight. The time of firing is believed to be well within the expertise of the man of ordinary skill in the art.

Powder X-ray diffraction analyses determined that in all of the MgO-containing bodies, except that fired at 700° C., spinel comprised essentially the sole crystal phase. The sample fired at 700° C. contained only a minor amount of spinel, thereby indicating the reaction temperature was too low.

The porous solid mass of each sample, including that composed of the ALON ® $Al_2O_3$, was crushed to pass a 40 mesh and remain on a 50 mesh United States Standard Sieve (40 mesh=420 microns; 50 mesh=297 microns). Because X-ray diffraction analyses indicated the presence of very minor amounts of MgO and/or $Al_2O_3$ in the fired spinel, the samples were immersed into a boiling aqueous solution containing 5% by weight HCl for one hour, removed therefrom, rinsed in distilled water, and vacuum dried. According to X-ray diffraction analyses, only spinel remained after that treatment.

Figure 2:
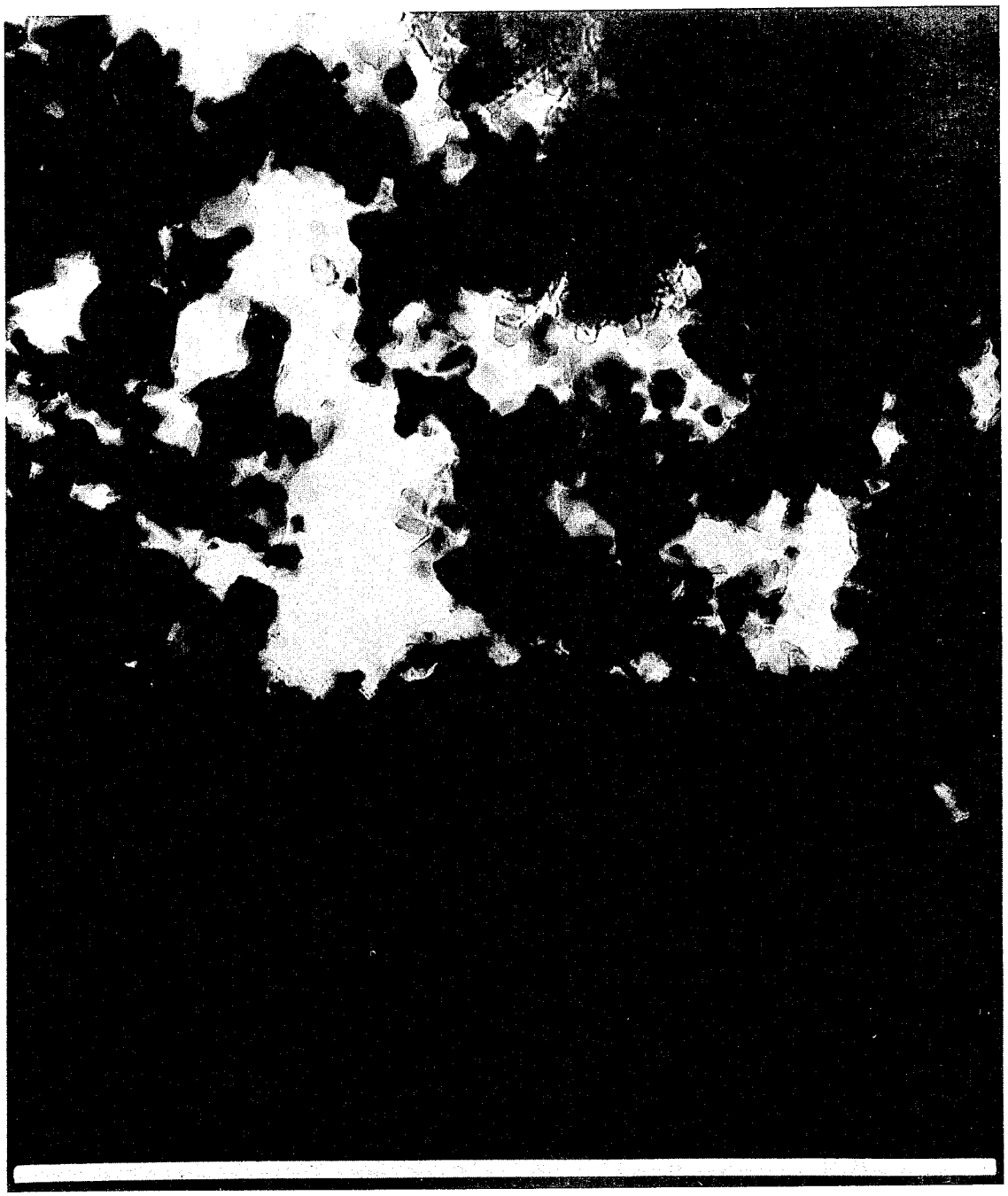

Bruner, Emmett, and Teller (BET) surface area measurements were conducted on each sample and the results are reported in Table I. As would be expected, the surface area of all the spinel samples is somewhat less than that of the $Al_2O_3$ due to the reaction of MgO with $Al_2O_3$. And, as would also be expected, the surface area of the spinel bodies decreased with increasing firing temperatures. This observed loss in surface area results from the growth of the individual spinel crystals. This is illustrated in FIGS. 1 and 2 which are transmission electron micrographs of the samples fired at 800° C. and 1200° C., respectively.

Figure 3:
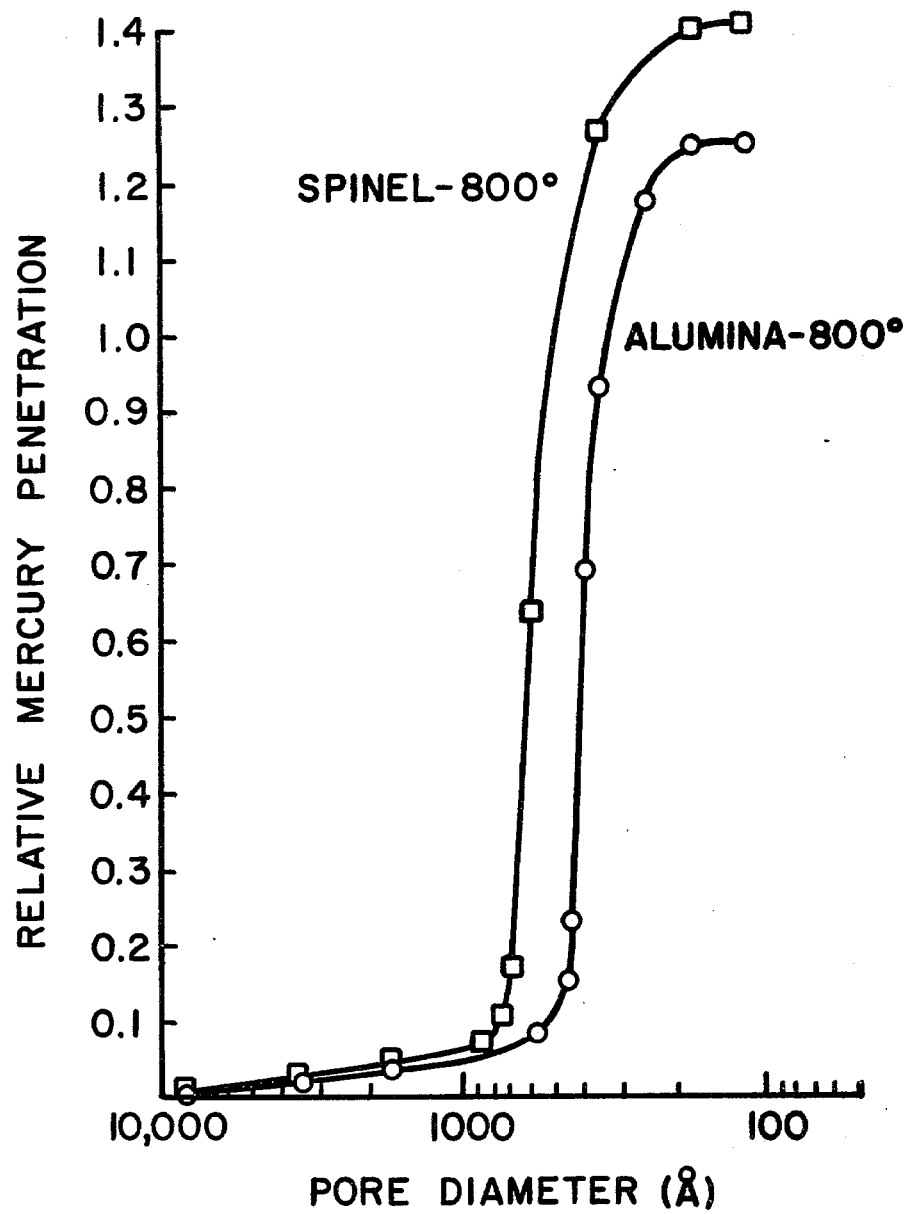
Figure 4:
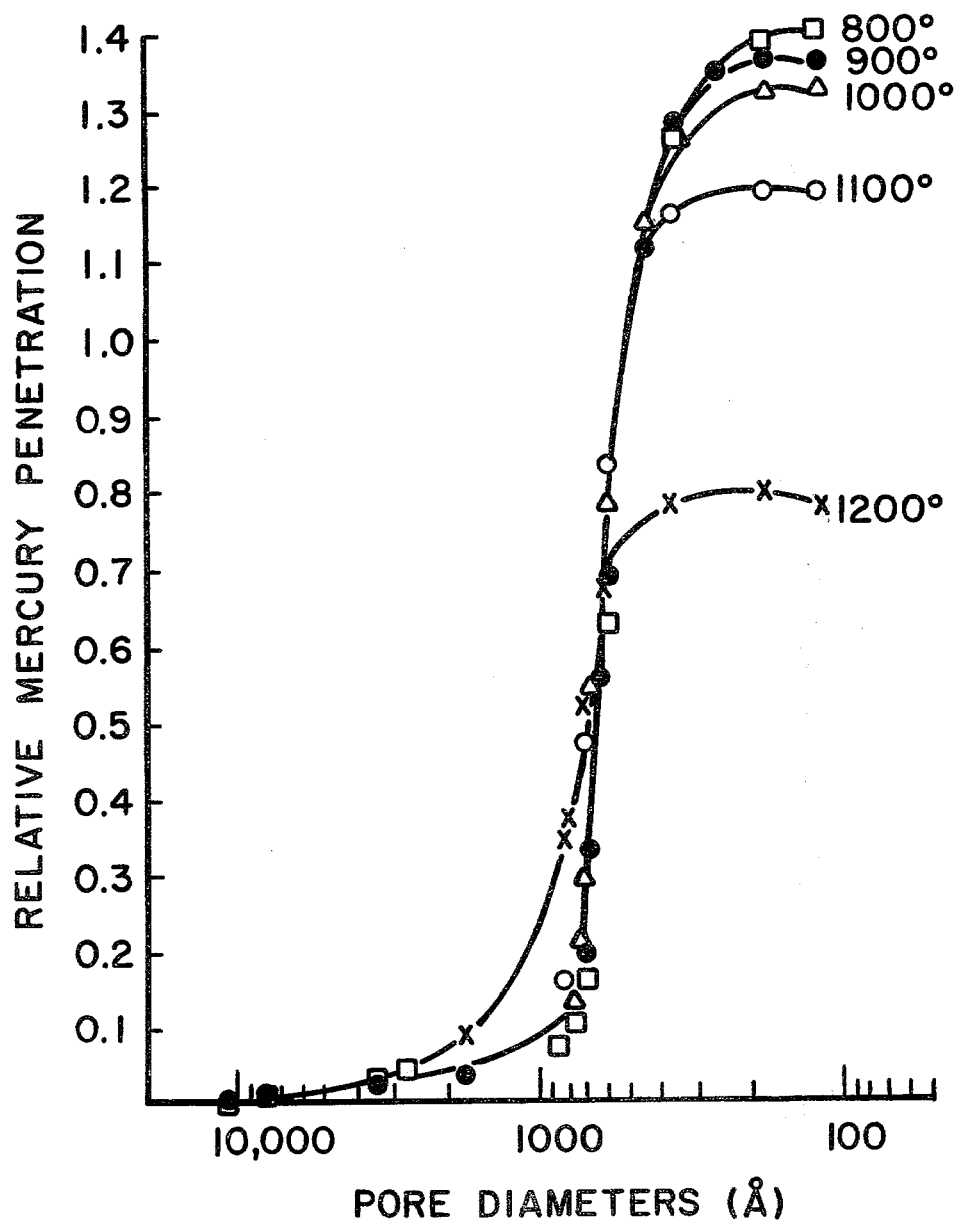

Porosimetry measurements utilizing mercury intrusion were conducted to determine the pore diameter distribution in the individual samples. FIG. 3 reports a comparison of the $Al_2O_3$ sample fired at 800° C. with the spinel sample also fired at 800° C. As can be observed, the average pore diameter of the $Al_2O_3$ sample is about 400 Å, whereas that of the spinel sample approximates 570 Å. The steepness of the curve clearly illustrates the narrow range of pore sizes demonstrated by the bodies. FIG. 4 compares the relative mercury penetration for the individual spinel samples. It can be seen that all of the samples have about the same average pore diameter, but the two higher temperature samples, viz., the 1100° C. and 1200° C. firings, have a wider range of pore sizes than do the others. Furthermore, it will be noted that as the firing temperature is increased, the total pore volume decreases.

To test the chemical durability of the various materials, the −40+50 mesh samples were treated in three different reagents at 95° C. for four hours; viz., an aqueous HCl solution having a pH of 1, a neutral aqueous solution having a pH of 7, and an aqueous $Na_2CO_3$ solution having a pH of 12. The weight loss experienced by several of the samples is reported in Table II. The weight loss encountered with the spinel materials is seen to be substantially less than that of the $Al_2O_3$ comparison sample. That circumstance recommends the use of such materials in highly hostile environments as supports for immobilized enzymes.

TABLE I

| Sample | Surface Area (meters$^2$/gram) |
| --- | --- |
| Al$_2$O$_3$ (800° C.) | 52 |
| Spinel (800° C.) | 48 |
| Spinel (900° C.) | 42 |
| Spinel (1000° C.) | 37 |
| Spinel (1100° C.) | 23 |

TABLE II

| | Weight Loss in Milligrams/Gram of Sample | | |
| --- | --- | --- | --- |
| Sample | HCl pH1 | H$_2$O pH7 | Na$_2$CO$_3$ pH12 |
| Al$_2$O$_3$ (800° C.) | 180 | 4.4 | 13 |
| Spinel (800° C.) | 88 | 3.5 | 1.4 |
| Spinel (900° C.) | 31 | — | — |
| Spinel (1000° C.) | 26 | 2.2 | None |
| Spinel (1100° C.) | 20 | 2.2 | None |
| Spinel (1200° C.) | 8.8 | 1.4 | None |

Through variations in heat treatment it is possible to produce bodies having surface areas ranging from about 10–75 meters$^2$/gram and wherein the average pore diameter will fall within the limits of about 450 Å–700 Å. FIG. 4 makes clear that the most close control of pore size is achieved at the lower temperature firings. Thus, about 80% of the pores appear to be within about ±20% of the average pore size. This again supports the preferred firing temperatures of about 900°–1100° C.

Formation of Gahnite Product

In a like manner a porous gahnite body can be prepared. Again, ALON ® Al$_2$O$_3$ comprised the source of the very finely-divided porous Al$_2$O$_3$. The zinc-containing compound pyrolyzable to ZnO selected was reagent grade zinc nitrate, hexahydrate [Zn(NO$_3$)$_2$.6H$_2$O]. A stock solution of the zinc compound was prepared by dissolving one pound of Zn(NO$_3$)$_2$.6H$_2$O in sufficient distilled water to make 621.9 ml. of solution. Thereafter, five test samples were compounded by blending 12 ml. of that solution with three grams of fumed Al$_2$O$_3$. The mixtures were poured into platinum crucibles and dried in air at a temperature just below the boiling point. The crucibles were then moved to an electrically-heated furnace and fired for 16 hours at 800° C., 900° C., 1000° C., 1100° C., and 1200° C., respectively.

Visual inspection of the fired samples evidenced that sintering had occurred in each, leaving a porous mass in the crucibles. In like manner to the spinel samples described above, a 16-hour firing time was chosen simply in the interest of convenience. The choice of an operable sintering schedule is well within the ingenuity of the ceramic technologist.

Figure 5:
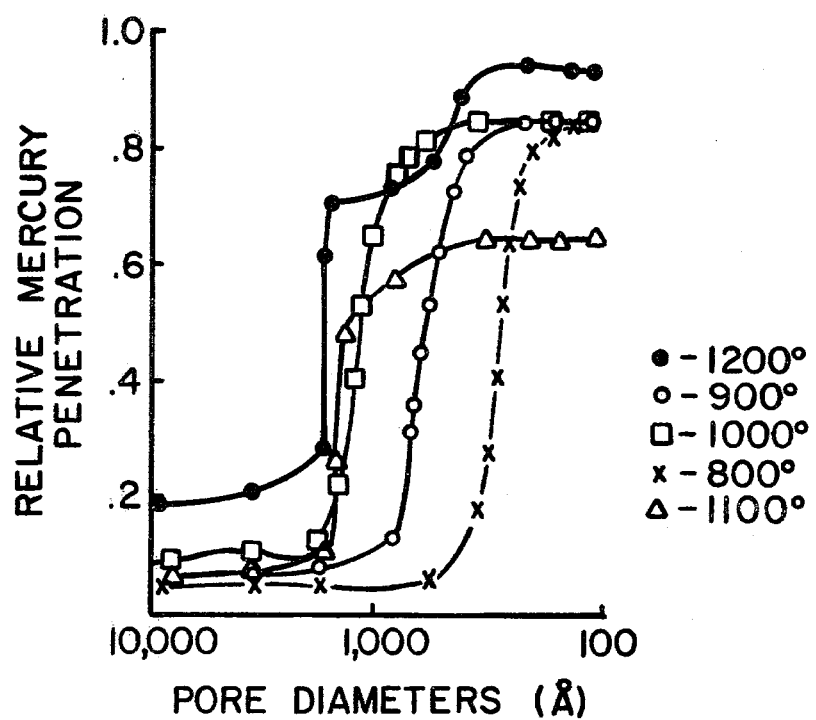

Powder X-ray diffraction analyses indicated that the predominant crystal phase in each product was gahnite with a minor presence of zinc oxide (ZnO). Porosimetry measurements employing mercury intrusion were undertaken to determine the pore diameter distribution in the individual gahnite samples. FIG. 5 provides a comparison of the relative mercury penetration for the several samples. It can be seen that the firing temperature has a profound effect upon the pore diameter produced in the bodies. Also, FIG. 5 illustrates that the closest control of pore size is achieved at the lower temperature firings. For example, at 800° and 900° C., 80% of the pores appear to be within about ±25% of the average pore size. However, the range of pore sizes becomes broader at about 1000° C. and assumes wide proportions at 1100° and 1200° C. Also, the overall porosity decreases. Accordingly, in the interests of rapid sintering, coupled with good control of pore sizes, the preferred firing schedule utilizes temperatures between about 850°–1000° C.

I claim:

1. A method for preparing porous bodies consisting essentially of spinel and/or crystals isostructural with spinel having an average pore size between about 450–700 Å, about 80% of said pores being within about ±25% of the average pore size, and having a surface area between about 10–75 meters$^2$/gram, said crystals having the general formula AO.B$_2$O$_3$ wherein A represents a divalent metal ion and B represents a trivalent metal ion, which comprises the steps of:

(a) impregnating a porous, trivalent metal ion-containing material having a surface area between about 50–500 meters$^2$/gram, said trivalent metal ion being selected from the group of Al$^{+3}$, Fe$^{+3}$, and Cr$^{+3}$, with a solution of a divalent metal ion-containing compound, said divalent metal ion being selected from the group of Mg$^{+2}$, Fe$^{+2}$, Mn$^{+2}$, and Zn$^{+2}$, which compound, upon pyrolysis, will be converted to the respective oxide or other compound capable of reacting with said trivalent metal ion-containing material, said divalent metal ion-containing compound being present in a quantity sufficient to produce an amount of the corresponding divalent metal oxide or other compound ranging from about, by weight, 5% below to about 10% above that required to stoichiometrically react with said trivalent metal ion-containing material;

(b) drying the impregnated material; and (c) firing the dried material at a temperature of at least 800° C., but not higher than about 1250° C., for a period of time sufficient to cause essentially complete reaction between said trivalent metal ion-containing material and said divalent metal ion-containing material to form spinel and/or crystals isostructural with spinel.

2. A method according to claim 1 wherein said solution is an aqueous solution.

3. A method according to claim 1 wherein said divalent metal ion-containing compound is selected from the group consisting of magnesium acetate, magnesium iodide, magnesium nitrate, magnesium salicylate, magnesium thiosulfate, zinc acetate, zinc perchlorate, zinc iodide, zinc nitrate, zinc sulfate, ferous acetate, ferrous chloride, ferrous nitrate, manganese acetate, manganese chloride, and manganese nitrate.

4. A method according to claim 1 wherein said impregnation is conducted at a temperature between the freezing point and boiling point of the solution.

5. A method according to claim 1 wherein said drying is conducted at a temperature below the boiling point of the solution.

6. A method according to claim 1 wherein said firing is conducted at a temperature between about 900°–1100° C. where the reaction product is magnesium spinel and about 850°–1000° C. where the reaction produce is gahnite.

* * * * *